Oct. 10, 1961 A. N. WELLS 3,004,214
APPARATUS FOR DETERMINING IDEALITY OF AQUEOUS
SOLUTIONS AND MIXTURES
Filed Oct. 21, 1958

INVENTOR.
Arthur N. Wells
BY
Shoemaker & Mattare
ATTYS

United States Patent Office 3,004,214
Patented Oct. 10, 1961

3,004,214
APPARATUS FOR DETERMINING IDEALITY OF AQUEOUS SOLUTIONS AND MIXTURES
Arthur N. Wells, P.O. Box 696, Belmont, Calif.
Filed Oct. 21, 1958, Ser. No. 768,623
7 Claims. (Cl. 324—30)

This invention relates in general to electrical testing apparatus and pertains more particularly to such apparatus especially adapted for determining a condition of aqueous solutions and mixtures.

More particularly, this invention is directed to directly measuring the deviation from ideal behavior of aqueous solutions, their mixtures as in soils and slurries and in the super-saturated state. For example, in waterworks practice, there is a calculation made for the stability index, which index represents the tendency of supply waters to be scale forming, corrosive or relatively trouble free. To make this calculation, it is first necessary to make an analysis consisting of amount of calcium present, total alkalinity, total solids, pH value and temperature. From these, an imperical index is obtained and the deviation from an arbitrary standard indicates whether the water will be corrosive or scale forming or whether the water will tend to be neither. With Langelier's index, the value determined is the deviation of the actual pH of the water from the calculated pH.

It is therefore of primary concern in connection with this invention to measure the deviation from the ideality, or saturation equilibrium, of aqueous solutions and mixtures by means of an electrical apparatus which makes the measurement directly and instantaneously without the involved analytical procedures now utilized for this purpose.

A further object of this invention is to provide an electrical apparatus for measuring the condition of aqueous solutions or mixtures including a probe assembly having three contact elements, two of which are connected to the opposite poles of a source of direct electrical energy and the third contact which is connected to an associated resistance bridge through an electrical meter for indicating directly the deviation from ideality of the aqueous solution or mixture.

Figure 2:
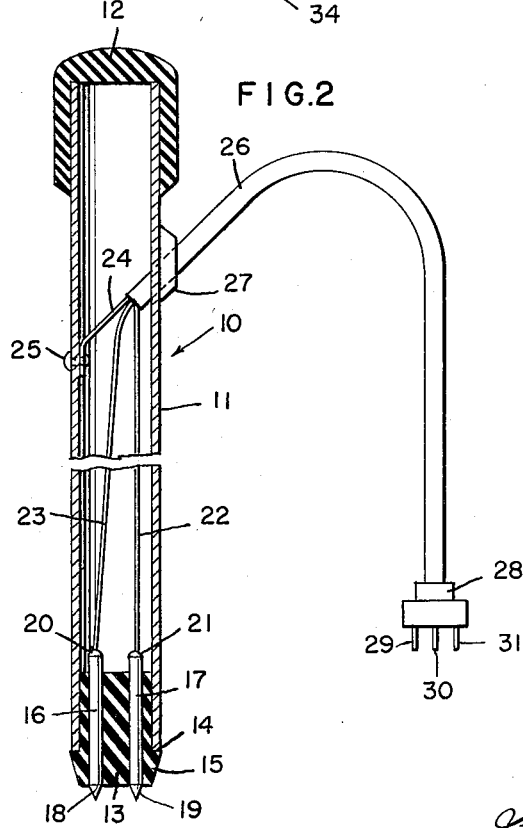
FIG. 2 is an enlarged longitudinal section taken through a probe assembly utilized in conjunction with this invention illustrating the relative disposition between the various contacts thereof.

Referring at this time more particularly to FIG. 2, the probe assembly as shown therein is indicated generally by the reference character 10 and will be seen to consist of an outer casing or tube 11 of electrically conductive material which is stainless steel, silver or the like, and which is provided at its upper end with an insulating top or cover 12 by means of which the probe may be conveniently grasped and which is provided at its lower end with a plug 13 also of insulating material. The lower end 14 of the plug 13 is preferably tapered as indicated by the reference character 15 so that the probe is more easily inserted into material such as soil.

The insulating plug 13 carries a pair of probe contacts 16 and 17 having pointed ends 18 and 19 projecting downwardly therefrom so as to make electrical contact with the material into which the end of the probe is inserted. The upper ends 20 and 21 of the probe contacts 16 and 17 extend beyond the upper end of the plug 13 and into the interior of the shell 11 and are connected to a pair of conductors 22 and 23 leading therefrom to join with a third conductor 24 which is grounded as by a fastening element or rivet 25 to the shell 11, as shown. The three conductors 22, 23 and 24 are of course electrically insulated from each other and housed within an insulating sheath 26 which projects through a suitable opening in the side wall of the shell 11 for disposition in the interior of such shell. Preferably, an insulating grommet 27 surrounds the sheath 26 and separates the same from direct contact with the edges of the opening in the side wall of the shell or tube 11.

Figure 1:
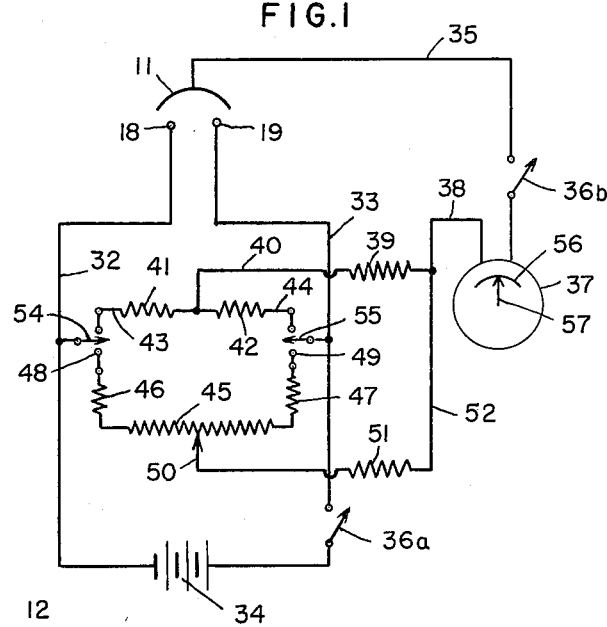
FIG. 1 is a schematic electrical circuit illustrating the principles of this invention.

The free end of the multiple conductor is provided with a plug 28 having three prongs 29, 30 and 31 projecting therefrom and which prongs are adapted to be electrically connected through a suitable socket into the electrical system indicated in FIG. 1.

In FIG. 1, the two probe contacts 18 and 19 are connected through electrical connections 32 and 33 and switch 36a to the opposite sides of a battery 34 or other suitable source of direct current. The tube or shell 11, on the other hand, is connected through an electrical conductor 35 and a manually operable switch 36b to one side of a zero-centered electrical meter 37. The other side of the electrical meter is connected through conductor 38 to parallel circuits which are in turn connected to parallel bridges across the two conductors 32 and 33 and hence across the opposite sides of the current source 34.

One such circuit includes the fixed resistor 39 which in turn is connected through a conductor 40 to the juncture between a pair of fixed equal resistors 41 and 42 which have their remote ends electrically connected through conductors 43 and 44 to the conductors 32 and 33. In parallel with the fixed resistors 41 and 42 is a potentiometer 45 and associated therewith a pair of fixed resistors 46 and 47 connected through conductors 48 and 49 to the aforementioned conductors 32 and 33.

The movable contact 50 of the potentiometer is connected through fixed resistance 51 and conductor 52 to the previously mentioned conductor 38 extending through the electrical meter 37.

The conductor 33 is provided with a manually controlled switch 36 to shut off the current supply when desired. Likewise, the two parallel resistor circuits are provided with manually operable tandem switches 54 and 55 by means of which either one but not both of the resistor circuits may be connected to the shell 11 through the meter 37.

The apparatus operates to measure the ionic distribution in the aqueous solution or mixture. If the water solution or mixture is completely neutral in equilibrium, that is, neither corrosive or scale forming, the meter 37 will always point to zero center on the scale 56 thereof, when 41 and 42 are in circuit. If, on the other hand, the ionic activity distribution is such that the solution or mixture is either corrosive or scale forming, the needle 57 will swing to one side or the other of the zero point on the scale dependent upon which condition exists in the water solution or mixture. The movable contact 50 of the potentiometer may be provided with a manually manipulated knob or handle having a pointer thereon operating to sweep across an associated scale, the scale reading zero when the pointer is in the midpoint of the resistor 45 and having progressively greater readings on opposite sides thereof.

When the potentiometer is used, the swinging needle 57 is centered on the zero point on the scale 56 by moving the potentiometer contact 50 and the imperical deviation from ideality of the solution or mixture is read directly from the potentiometer scale. If, on the other hand, the two fixed resistors 41 and 42 are used, the reading of the needle 57 on the scale 56 is directly taken as the deviation from ideality. The units assigned, can, of course, be purely arbitrary but should be closely enough spaced as to offer a substantial index for reference purposes.

Figure 3:
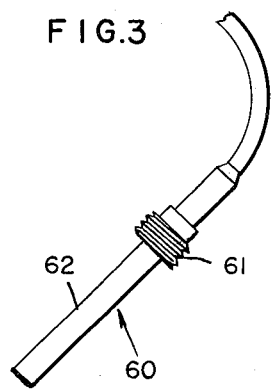
FIG. 3 is an elevational view of a modified form of probe assembly in the form of a plug which may be attached to and directly inserted into a pipe.

In the form of the invention shown in FIG. 3, the probe assembly indicated generally by the reference character 60 is similar to the probe assembly in FIG. 2 inasmuch as the same utilizes a pair of centrally disposed probe contacts and an outer shell contact. However, in this case, the probe is provided with an externally threaded nut or boss 61 by means of which the probe assembly may be secured directly to a pipe through a tapped hole therein, such as the main body portion 62 of the probe projects directly into the solution or mixture flowing through the pipe so that instantaneous readings can be taken at all times of the liquid in the pipe.

I claim:

1. Apparatus for determining the ideality of aqueous solutions and mixtures comprising a probe assembly having a pair of fixed contacts disposed in spaced relation to each other and a third electrically conductive element spaced from said pair of contacts, said conductive element having a substantially greater surface than the surface of either of said contacts, a source of electrical energy, said contacts being connected to said source of electrical energy, a voltmeter, one side of said voltmeter being connected to said electrically conductive element and having its other side connected to a resistance bridge across said source of electrical energy.

2. Apparatus for determining the ideality of aqueous solutions and mixtures comprising a probe assembly having a pair of fixed contacts disposed in spaced relation to each other and a third electrically conductive element spaced from said pair of contacts, said conductive element having a substantially greater surface than the surface of either of said contacts, a source of electrical energy, said contacts being connected to said source of electrical energy, a voltmeter, one side of said voltmeter being connected to said electrically conductive element and having its other side connected to a resistance bridge across said source of electrical energy, said resistance bridge being a variable potentiometer in which the movable contact thereof is directly connected to said meter.

3. An electrical system for testing aqueous solutions and mixtures comprising a potentiometer having a sliding contact and connected at its opposite ends across a source of electrical energy, a probe assembly having a pair of spaced contacts also connected across said source of electrical energy, said potentiometer having a sliding contact connected to one side of a voltmeter, and a third contact surrounding said pair of contacts and connected to the other side of said voltmeter, said conductive element having a substantially greater surface than the surface of either of said contacts.

4. An electrical system for testing aqueous solutions and mixtures comprising a potentiometer having a sliding contact and connected at its opposite ends across a source of electrical energy, a probe assembly having a pair of spaced contacts also connected across said source of electrical energy, said potentiometer having a sliding contact connected to one side of a voltmeter, and a third contact surrounding said pair of contacts and connected to the other side of said voltmeter, a pair of fixed resistance members connected in parallel with said potentiometer, said one side of the voltmeter being connected to the midpoint between said fixed resistors, and switch means for selectively connecting the fixed resistors and the potentiometer to the source of the electrical energy.

5. A probe assembly for testing aqueous solutions and mixtures comprising an elongated tube, an insulating plug closing one end of said tube, a pair of contacts extending through said plug to protrude beyond the associated end of said tube, a pair of electrical conductors connected to said contacts internally of said tube and there being a third conductor grounded to said tube, all of such conductors projecting outwardly through said tube for connection to an associated electrical circuit, and a handle on the end of said tube opposite said plug.

6. A probe assembly for testing aqueous solutions and mixtures comprising an elongated tube, an insulating plug closing one end of said tube, a pair of contacts extending through said plug to protrude beyond the associated end of said tube, a pair of electrical conductors connected to said contacts internally of said tube and there being a third conductor grounded to said tube, all of such conductors projecting outwardly through said tube for connection to an associated electrical circuit, a collar fixed to said tube and having external threads thereon for connection to a pipe such that the major portion of said tube and the contacts project into the pipe.

7. An electrical measuring system for determining ionic distribution in aqueous solutions comprising a probe assembly having three space contacts, electric circuitry connected to said contacts, said circuitry including a source of electrical current connected serially to a pair of said contacts, the third contact being connected to resistance means disposed in parallel across said pair of contacts, said conductive element having a substantially greater surface than the surface of either of said contacts, a voltmeter connected in series between said third contact and said resistance means whereby deviations in current flowing through the third contact circuit due to the differences in ionic concentrations in the solution are measured by said voltmeter.

References Cited in the file of this patent

UNITED STATES PATENTS

| | | |
|---|---|---|
| 1,755,479 | Jones | Apr. 22, 1930 |
| 2,082,213 | O'Donnell | June 1, 1937 |
| 2,525,754 | Albrecht | Oct. 17, 1950 |
| 2,870,404 | Oxley | Jan. 20, 1959 |